United States Patent
Yamada

(10) Patent No.: US 8,687,687 B2
(45) Date of Patent: Apr. 1, 2014

(54) COMMUNICATION SYSTEM

(75) Inventor: Makiko Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 505 days.

(21) Appl. No.: 12/989,464

(22) PCT Filed: Jun. 5, 2009

(86) PCT No.: PCT/JP2009/060311
§ 371 (c)(1),
(2), (4) Date: Oct. 25, 2010

(87) PCT Pub. No.: WO2010/001684
PCT Pub. Date: Jan. 7, 2010

(65) Prior Publication Data
US 2011/0090889 A1    Apr. 21, 2011

(30) Foreign Application Priority Data
Jun. 30, 2008    (JP) .................................. 2008-170416

(51) Int. Cl.
*H04B 1/66* (2006.01)
*H04J 3/16* (2006.01)

(52) U.S. Cl.
USPC ........................................ 375/240; 370/470

(58) Field of Classification Search
USPC ...................... 370/465–471; 375/240–240.25
See application file for complete search history.

(56) References Cited

U.S. PATENT DOCUMENTS

| | | | | |
|---|---|---|---|---|
| 5,862,452 A | * | 1/1999 | Cudak et al. ..................... 725/81 |
| 6,058,106 A | * | 5/2000 | Cudak et al. .................. 370/313 |
| 7,512,118 B1 | * | 3/2009 | Stephens ....................... 370/352 |
| 8,244,969 B2 | * | 8/2012 | McWilliams et al. ........ 711/103 |
| 2004/0181811 A1 | * | 9/2004 | Rakib ............................ 725/122 |
| 2005/0063382 A1 | * | 3/2005 | Fenner ........................... 370/389 |
| 2007/0110046 A1 | * | 5/2007 | Farrell et al. .................. 370/389 |
| 2010/0322265 A1 | * | 12/2010 | Gopinath et al. ............. 370/417 |

FOREIGN PATENT DOCUMENTS

| | | |
|---|---|---|
| CN | 1604684 A | 4/2005 |
| JP | 2001320422 A | 11/2001 |
| JP | 2002094553 A | 3/2002 |
| JP | 2002141931 A | 5/2002 |
| JP | 2004511178 A | 4/2004 |
| JP | 2005124077 A | 5/2005 |
| JP | 2005252855 A | 9/2005 |
| JP | 3979084 B | 9/2007 |

OTHER PUBLICATIONS

International Search Report for PCT/JP2009/060311 mailed Aug. 4, 2009.

(Continued)

*Primary Examiner* — Thai Hoang

(57) ABSTRACT

A mobile station transmits a physical address given to the mobile station to a connection device via a base station when subscribing to a communication system. The connection device previously stores the physical address given to the mobile station and an IP address in a table of the connection device in association with each other, searches the table for the IP address corresponding to the physical address transmitted from the mobile station from the address storage section, generates a header compression rule in accordance with the IP address searched for, and transmits the generated header compression rule to the mobile station via the base station.

13 Claims, 13 Drawing Sheets

(56) References Cited

OTHER PUBLICATIONS

IEEE Std 802.16, IEEE Standard for Local and metropolitan area networks, Part 16: Air Interface for Fixed Broadband Wireless Access Systems, Oct. 1, 2004, pp. 23-27, 167-190.

Michael Carlberg Lax et al., "WiMAX—A Study of Mobility and a MAC-layer Implementation in GloMoSim", UMEA University, Apr. 6, 2006, pp. 26-30, 75-77.

Chinese Office Action for CN200980121511.6, issued on Mar. 5, 2013 with English Translation.

* cited by examiner

Fig.8

| MAC address | IP address |
|---|---|
| 01-0A-03-0B-05-0C | 111.11.1.1 |
| 02-0D-04-0E-06-0F | 222.22.2.2 |
| 07-0A-08-0B-09-0C | 333.33.3.3 |

COMMUNICATION SYSTEM

TECHNICAL FIELD

The present invention relates to a communication system, connection device, connection method and program for providing a service to a mobile terminal.

BACKGROUND ART

A mobile WiMAX (Worldwide interoperability for Microwave Access) system realized by applying to mobile communication a WiMAX technique, which is becoming a focus of attention in recent years, includes an MS, which is a mobile station that receives a service by subscribing to the system, a BS, which is a base station configured to be connectable to the MS and an ASN-GW (Access Service Network Gateway), which is a connection device for connecting the MS to a network via the BS.

FIG. 1 is a diagram illustrating one configuration example of a general WiMAX system.

The WiMAX system shown in FIG. 1 is provided with DHCP server 1003, ASN-GW 1004, BS 1005 and MS 1006.

DHCP server 1003 is a server which is located on CSN (Connectivity Service Network) 1001 and has a DHCP (Dynamic Host Configuration Protocol) function which is a protocol for automatically setting an IP (Internet Protocol) address in MS 1006.

ASN-GW 1004 is a connection device for connecting CSN 1001 to ASN (Access Service Network) 1002. Furthermore, ASN-GW 1004 is connected to DHCP server 1003 and BS 1005.

BS 1005 is a base station located on ASN 1002 and configured to be connectable to MS 1006.

MS 1006 is a mobile station which is movable and communicates with CSN 1001 via BS 1005 and ASN-GW 1004.

Furthermore, for not only such a WiMAX system but also a communication system that communicates packet data, JP2005-124077A discloses a technique of performing communication by compressing a packet header of the packet data for reducing on the communication bandwidth. An example of such a technique is a PHS (Payload Header Suppression) rule.

The PHS rule is a mechanism of payload header compression capable of efficiently operating a communication channel by reducing information of a redundant packet header and thereby reducing bands used.

FIG. 2 is a diagram illustrating an example of compression of a packet header to which a predetermined PHS rule is applied.

As shown in FIG. 2, part of the packet header section to which the predetermined PHS rule is applied, of the packet data made up of MAC (Media Access Control) header, IP header and UDP (User Datagram Protocol)/TCP (Transmission Control Protocol) header and data, and CRC (Cyclic Redundancy Check) field is compressed. Here, the IP header section of the packet header is compressed.

FIG. 3 is a diagram illustrating the PHS rule.

In FIG. 3, a packet header made up of A, B, C, D and E is transmitted from the transmitting side which is a transmission apparatus to the receiving side which is a receiving apparatus via a radio zone. Here, A, B, C, D and E are data in byte units. Applying the PHS rule to this packet header causes the packet header to be compressed.

Here, desired data can be compressed using "PHSM (PHS-Mask)" which is information indicating the position to be compressed and "PHSF (PHS-Field)" which is the content (information) of data to be compressed. For example, by setting "1" in "PHSM" of A, C and E respectively at the transmission apparatus, A, C and E are compressed and transmitted. That is, as shown in FIG. 3, the packet header in the radio zone is made up of B and D. Furthermore, by setting respective values in "PHSF" of compressed A, C and E, "PHSF" in which the value is set is transmitted from the transmitting side to the receiving side, and compressed A, C and E are reconstructed on the receiving side respectively.

Hereinafter, a case will be described where the aforementioned PHS rule is applied to the WiMAX system shown in FIG. 1.

FIG. 4 is a diagram illustrating an example of an internal configuration of ASN-GW 1004 shown in FIG. 1.

As shown in FIG. 4, ASN-GW 1004 shown in FIG. 1 is provided with BS interface section 1041, service flow generation section 1042, CSN data transfer section 1043 and PHS rule storage section 1044.

BS interface section 1041 has an interface function for BS 1005.

Service flow generation section 1042 reads the PHS rule stored in PHS rule storage section 1044 and transmits the read PHS rule to BS 1005 via BS interface section 1041.

CSN data transfer section 1043 has an interface function for CSN 1001.

PHS rule storage section 1044 stores the PHS rule manually created beforehand.

Hereinafter, a method for MS 1006 to subscribe to the WiMAX system shown in FIG. 1 (Network Entry) will be described.

FIG. 5 is a sequence diagram illustrating a method for MS 1006 to subscribe to the WiMAX system shown in FIG. 1.

First, in step 81, an RNG-REQ (Ranging-Request) message which is a ranging request signal is transmitted from MS 1006 to BS 1005. In step 82, an RNG-RSP (Ranging-Response) message which is a response signal to the RNG-REQ message is transmitted from BS 1005 to MS 1006.

Next, in order to perform negotiation on information on various types of capability (capacity), in step 83, an SBC-REQ (Station Basic Capability-Request) message is transmitted from MS 1006 to BS 1005. In step 84, an SBC-RSP (Station Basic Capability-Response) Message which is a response signal to the SBC-REQ message is transmitted from BS 1005 to MS 1006.

Next, in step 85, a REG-REQ (Registration-Request) message which is a registration request signal is transmitted from MS 1006 to BS 1005. In step 86, a REG-RSP (Registration-Response) message which is a response signal to the REG-REQ message is transmitted from BS 1005 to MS 1006.

A DSA-REQ (Dynamic Service Addition-Request)/RSP/ACK (Acknowledge) message for establishing a new service flow is transmitted/received between BS 1005 and MS 1006 one time for an uplink and a downlink in steps 87 to 92. In this case, the DSA-REQ message transmitted from BS 1005 to MS 1006 includes the PHS rule.

After that, in steps 93 to 96, MS 1006 requests an IP address to DHCP server 1003 via BS 1005 and ASN-GW 1004, and DHCP server 1003 assigns an IP address to MS 1006.

However, generation of the aforementioned PHS rule involves the following problems.

A first problem is that since the PHS rule is manually created, unless the content of a packet is known beforehand, it is possible neither to specify the compression location nor to generate the PHS rule.

A second problem is that since the PHS rule cannot be generated unless the content of a packet is known beforehand, it is only fixed IP addresses that can be handled. That is, when an IP address is assigned using DHCP, the IP address part cannot be compressed.

SUMMARY OF INVENTION

It is an object of the present invention to provide a communication system, connection device, connection method and program for solving the aforementioned problems.

In order to attain the above described object, the present invention is a communication system made up of a mobile station, a base station that communicates with the mobile station by applying a header compression rule for compressing a packet header and a connection device that connects the base station to a predetermined network, wherein the mobile station transmits a physical address given to the mobile station to the connection device via the base station when subscribing to the communication system, the connection device includes an address storage section that previously stores the physical address given to the mobile station and an IP address in association with each other, searches the address storage section for the IP address corresponding to the physical address transmitted from the mobile station, generates the header compression rule in accordance with the IP address searched for, and transmits the generated header compression rule to the mobile station via the base station.

Furthermore, the present invention is a connection device connected to a base station that communicates with a mobile station by applying a header compression rule for compressing a packet header, including an address storage section that previously stores a physical address given to the mobile station and an IP address in association with each other, a service flow generation section that searches the address storage section for the IP address corresponding to the physical address transmitted from the mobile station and generates a header compression rule in accordance with the IP address searched for, and a base station interface section that transmits the generated header compression rule to the mobile station via the base station.

Furthermore, the present invention is a connection method for a communication system made up of a mobile station, a base station that communicates with the mobile station by applying a header compression rule for compressing a packet header and a connection device that connects the base station to a predetermined network, including a step of the mobile station transmitting a physical address given to the mobile station to the connection device via the base station when subscribing to the communication system, a step of the connection device previously storing the physical address given to the mobile station and an IP address in a table of the connection device in association with each other, a step of the connection device searching the table for the IP address corresponding to the physical address transmitted from the mobile station, a step of the connection device generating a header compression rule in accordance with the IP address searched for, and a step of the connection device transmitting the generated header compression rule to the mobile station via the base station.

Furthermore, the present invention is a connection method of connecting a mobile station to a network via a base station, including a step of previously storing a physical address given to the mobile station and an IP address in association with each other, a step of searching the stored correspondence for the IP address corresponding to the physical address transmitted from the mobile station, a step of generating a header compression rule for compressing a packet header in accordance with the IP address searched for, and a step of transmitting the generated header compression rule to the mobile station via the base station.

The present invention is a program for causing a computer connected to a base station that communicates with a mobile station by applying a header compression rule for compressing a packet header, to execute a step of previously storing a physical address given to the mobile station and an IP address in a table provided for the computer in association with each other, a step of searching the table for the IP address corresponding to the physical address transmitted from the mobile station, a step of generating the header compression rule in accordance with the IP address searched for and a step of transmitting the generated header compression rule to the mobile station via the base station.

As described above, the present invention adopts a configuration in which the mobile station transmits the physical address given to the mobile station to the connection device via the base station when subscribing to the communication system, the connection device previously stores the physical address given to the mobile station and an IP address in a table provided for the connection device in association with each other, searches the table for the IP address corresponding to the physical address transmitted from the mobile station, generates a header compression rule in accordance with the IP address searched for, and transmits the generated header compression rule to the mobile station via the base station, and the present invention can thereby easily generate and apply a PHS rule which is the header compression rule.

BRIEF DESCRIPTION OF DRAWINGS

FIG. 8 is a diagram illustrating an example of a structure of the address correspondence table shown in FIG. 7.

DESCRIPTION OF EMBODIMENTS

Hereinafter, exemplary embodiments of the present invention will be described with reference to the accompanying drawings.

Figure 6:
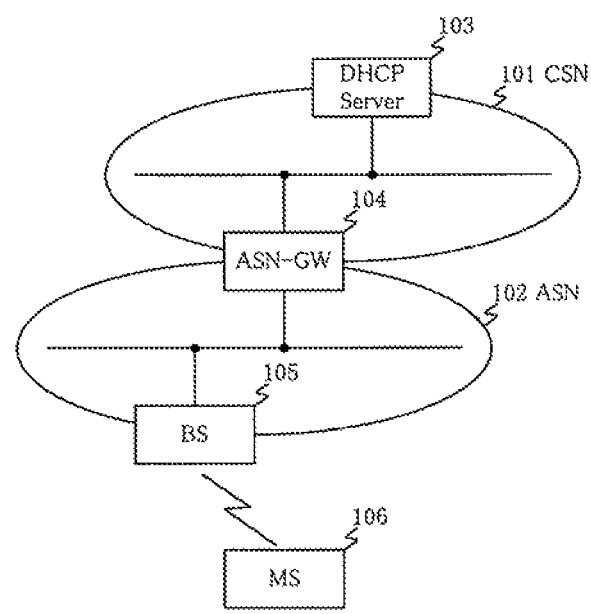
FIG. 6 is a diagram illustrating one exemplary embodiment of a communication system according to the present invention.

FIG. 6 is a diagram illustrating one exemplary embodiment of a communication system according to the present invention.

As shown in FIG. 6, the present exemplary embodiment is a WiMAX system provided with DHCP server 103, ASN-GW 104, BS 105 and MS 106.

Figure 1:
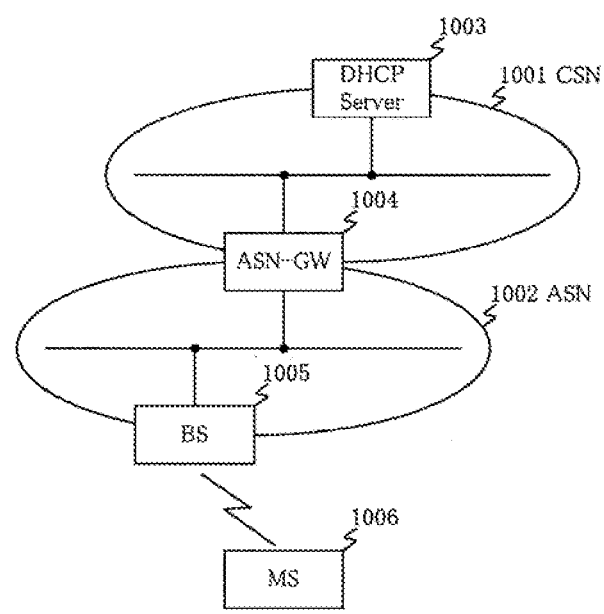
FIG. 1 is a diagram illustrating one configuration example of a general WiMAX system.
Figure 2:
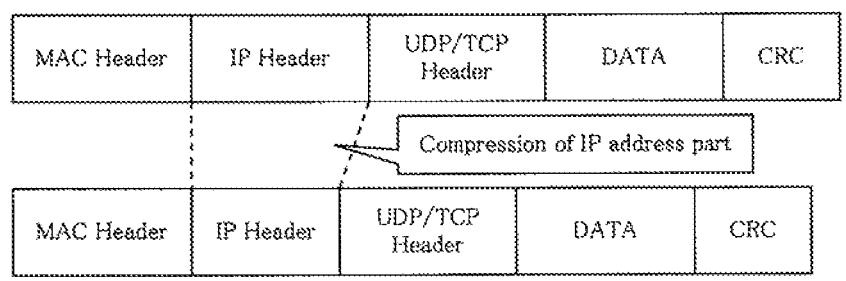
FIG. 2 is a diagram illustrating an example of compression of a packet header to which a predetermined PHS rule is applied.
Figure 3:
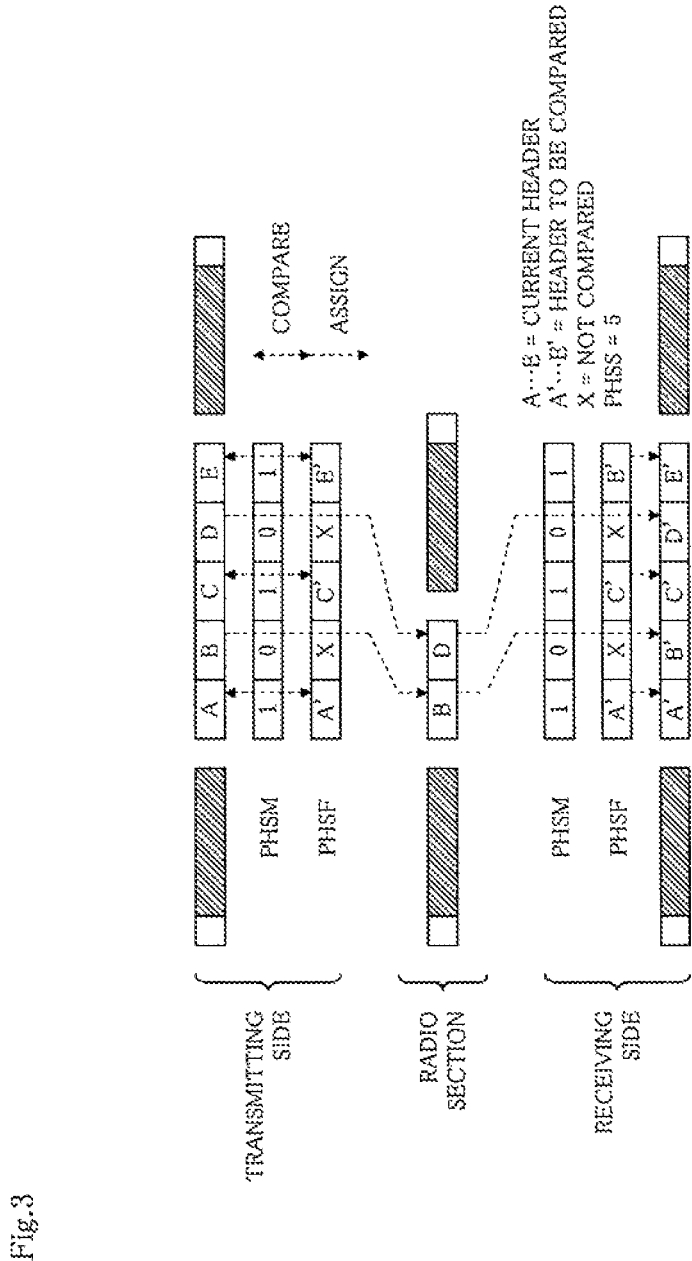
FIG. 3 is a diagram illustrating the PHS rule.
Figure 4:
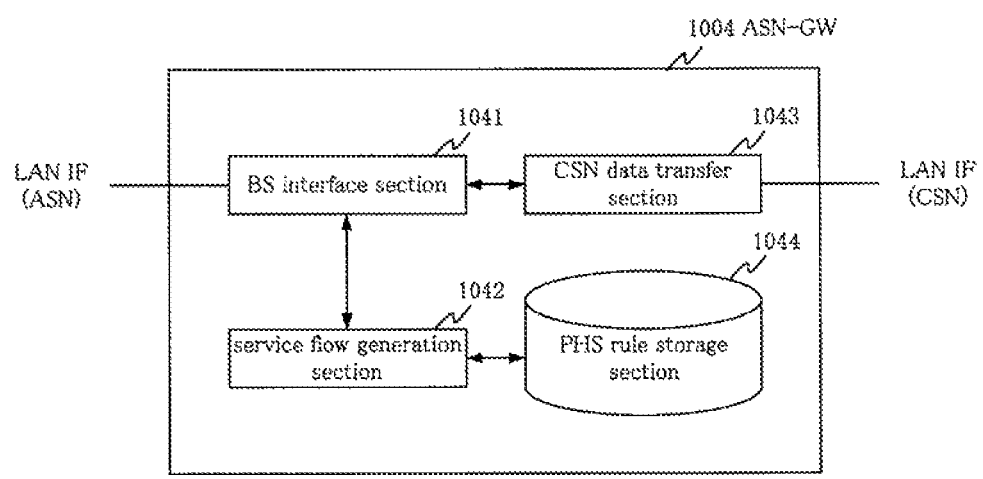
FIG. 4 is a diagram illustrating an example of an internal configuration of the ASN-GW shown in FIG. 1.

DHCP server 103 is a server which is located on CSN (Connectivity Service Network) 101 and has a DHCP (Dynamic Host Configuration Protocol) function, which is a protocol for automatically setting an IP address in MS 106. DHCP server 103 may be the same as DHCP server 1003 shown in FIG. 1.

ASN-GW 104 is a connection device for connecting CSN 101 and ASN (Access Service Network) 102. Furthermore, ASN-GW 104 is connected to DHCP server 103 and BS 105.

BS 105 is a base station which is located on ASN 102 and configured to be connectable to MS 106. Furthermore, BS 105 performs subscription processing (Network Entry) for MS 106 at the request of MS 106.

MS 106 is a mobile station that communicates with CSN 101 via BS 105 and ASN-GW 104.

Figure 7:
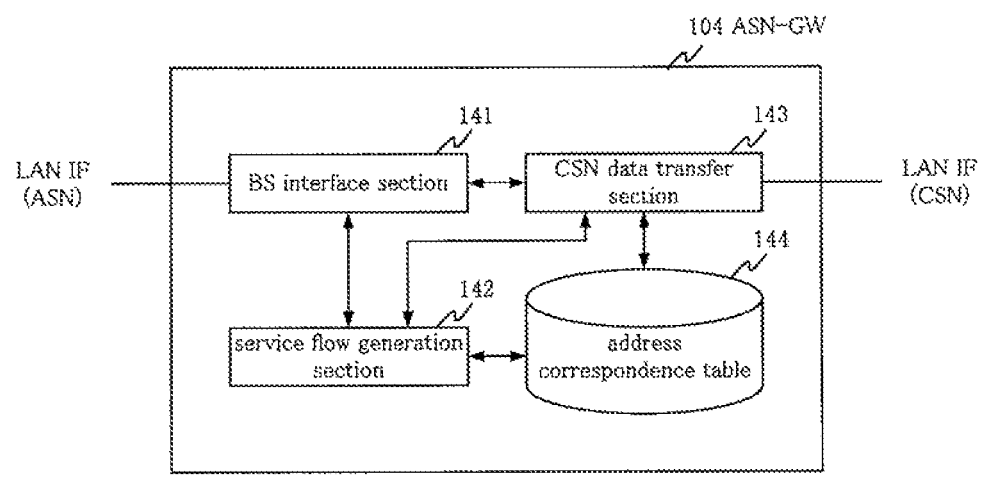
FIG. 7 is a diagram illustrating an example of the internal configuration of the ASN-GW shown in FIG. 6.

FIG. 7 is a diagram illustrating an example of an internal configuration of ASN-GW 104 shown in FIG. 6.

ASN-GW 104 shown in FIG. 6 is provided with BS interface section 141, service flow generation section 142, CSN data transfer section 143 and address correspondence table 144 as shown in FIG. 7.

BS interface section 141 is a base station interface section having an interface function for BS 105.

Service flow generation section 142 reads an IP address stored in address correspondence table 144 and generates a PHS rule which is a header compression rule based on the read IP address. Furthermore, service flow generation section 142 generates a service flow including the generated PHS rule and transmits the service flow to BS 105 via BS interface section 141.

CSN data transfer section 143 has an interface function for CSN 101.

Address correspondence table 144 is an address storage section that stores the correspondence between a MAC address which is a physical address given to MS 106 and an IP address.

FIG. 8 is a diagram illustrating an example of a structure of address correspondence table 144 shown in FIG. 7.

Address correspondence table 144 shown in FIG. 7 stores the MAC address which is a physical address given to each MS and an IP address in association with each other as shown in FIG. 8.

The IP address is the IP address acquired by the MS from DHCP server 103.

For example, MAC address "01-0A-03-0B-05-0C" and IP address "111.11.1.1" are stored in association with each other. This means that the IP address of an MS whose MAC address is "01-0A-03-0B-05-0C" is "111.11.1.1." Furthermore, MAC address "02-0D-04-0E-06-0F" and IP address "222.22.2.2" are stored in association with each other. This means that the IP address of an MS whose MAC address is "02-0D-04-0E-06-0F" is "222.22.2.2." Furthermore, MAC address "07-0A-08-0B-09-0C" and IP address "333.33.3.3" are stored in association with each other. This means that the IP address of an MS whose MAC address is "07-0A-08-0B-09-0C" is "333.33.3.3." There are three sets of correspondence between MAC addresses and IP addresses shown in FIG. 8, but it goes without saying that the number of sets stored in address correspondence table 144 is not limited to 3. Furthermore, for convenience of explanation, enumeration of simple numbers is used as the MAC addresses and IP addresses shown in FIG. 8, but this has nothing to do with real addresses and it does not matter whether or not the addresses actually exist.

Hereinafter, a method for MS 106 to subscribe to the communication system shown in FIG. 6 (Network Entry) will be described. First, a case will be described where address correspondence table 144 shown in FIG. 7 stores the correspondence between the MAC address given to MS 106 and the IP address. As an example, a case will be described where the MAC address of MS 106 is "01-0A-03-0B-05-0C" and address correspondence table 144 stores the correspondence shown in FIG. 8.

Figure 9:
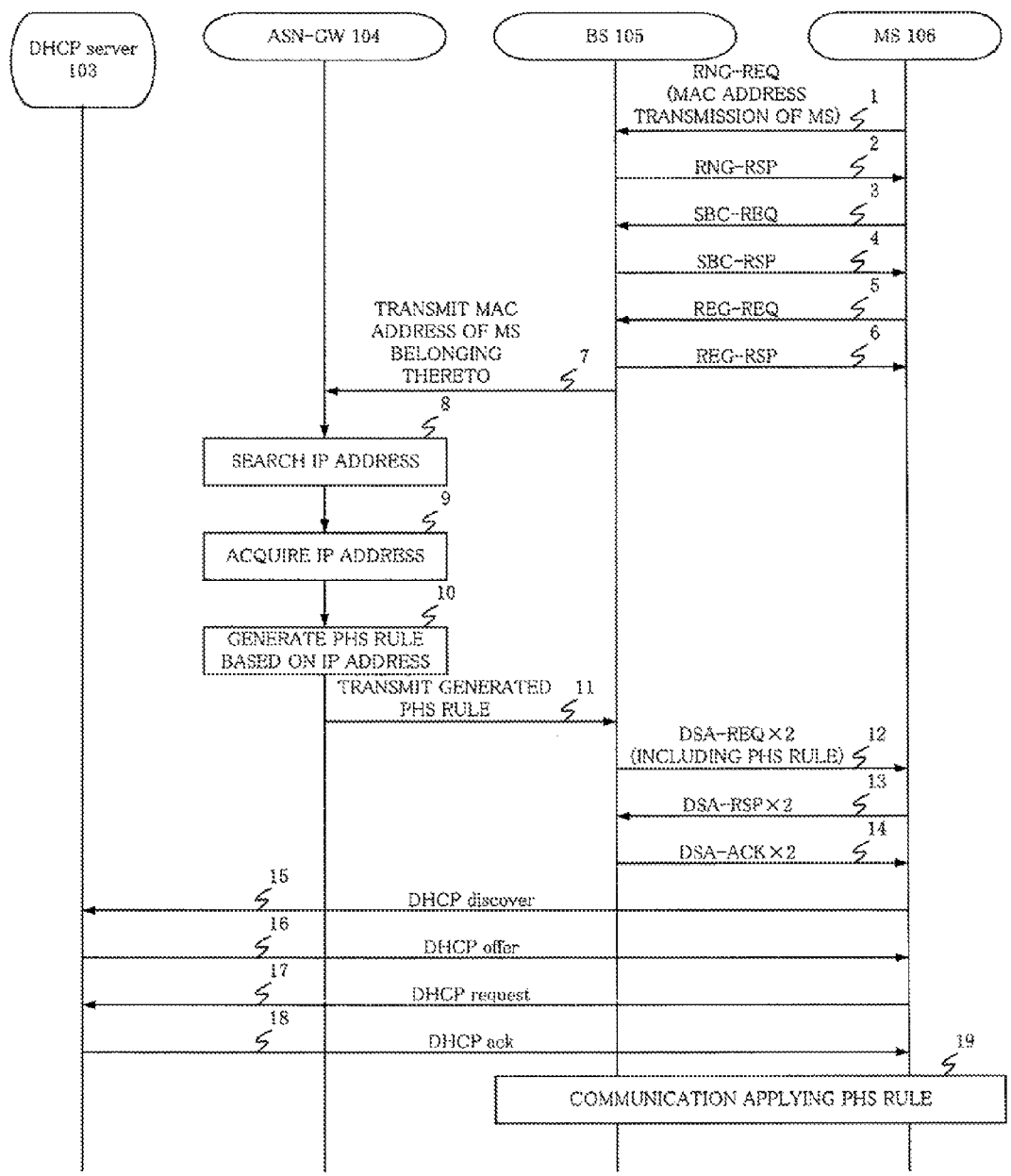
FIG. 9 is a sequence diagram illustrating a method for the MS to subscribe to the communication system shown in FIG. 6 when the address correspondence table shown in FIG. 7 stores the correspondence between the MAC address given to the MS and the IP address.

FIG. 9 is a sequence diagram illustrating the method for MS 106 to subscribe to the communication system shown in FIG. 6 when address correspondence table 144 shown in FIG. 7 stores the correspondence between the MAC address given to MS 106 and the IP address.

First, in step 1, an RNG-REQ message which is a ranging request signal is transmitted from MS 106 to BS 105. In this case, the MAC address given to MS 106 is transmitted using the RNG-REQ message.

In step 2, an RNG-RSP message which is a response signal to the RNG-REQ message is transmitted from BS 105 to MS 106.

To perform negotiation on various types of capability (capacity) information, in step 3, an SBC-REQ message is transmitted from MS 106 to BS 105. Then in step 4, an SBC-RSP message which is a response signal to the SBC-REQ message is transmitted from BS 105 to MS 106.

In step 5, a REG-REQ message which is a registration request signal is transmitted from MS 106 to BS 105. Then in step 6, a REG-RSP message which is a response signal to the REG-REQ message is transmitted from BS 105 to MS 106.

Figure 5:
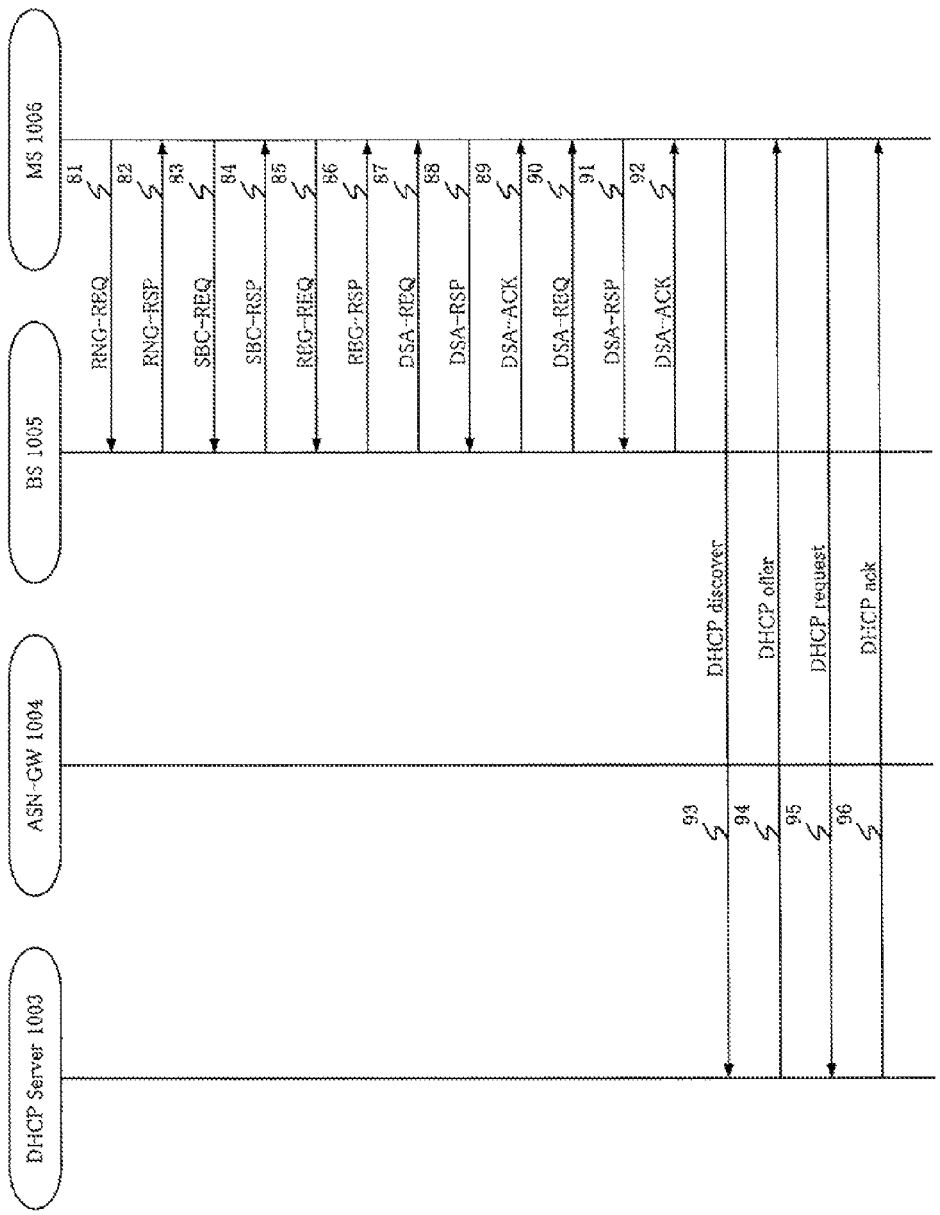
FIG. 5 is a sequence diagram illustrating a method for the MS to subscribe to the WiMAX system shown in FIG. 1.

The processing in steps 2 to 6 is the same as the processing in steps 82 to 86 described using FIG. 5.

After that, the MAC address of MS 106 transmitted from MS 106 in step 1 is transmitted from BS 105 to ASN-GW 104 in step 7.

The MAC address of MS 106 transmitted from BS 105 is received by BS interface section 141 of ASN-GW 104, and in step 8, service flow generation section 142 searches address correspondence table 144 for the IP address corresponding to the MAC address. Here, since the correspondence between MAC address "01-0A-03-0B-05-0C" given to MS 106 and IP address "111.11.1.1" is stored in address correspondence table 144, IP address "111.11.1.1" corresponding to MAC address "01-0A-03-0B-05-0C" is acquired in step 9.

Service flow generation section 142 then generates a PHS rule based on the acquired IP address in step 10.

Here, for an uplink signal (signal from MS 106 to BS 105) between BS 105 and MS 106, a PHS rule for performing header compression to omit the Source address of the IP header included in the uplink signal is generated. Furthermore, for a downlink signal (signal from BS 105 to MS 106) between BS 105 and MS 106, a PHS rule for performing header compression to omit the Destination address of the IP header included in the downlink signal is generated.

Figure 10:
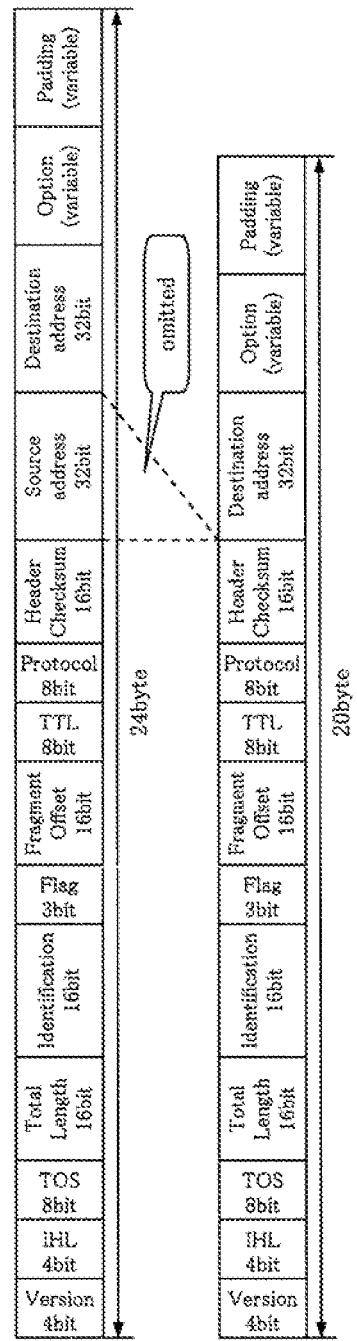
FIG. 10 is a diagram illustrating header compression of an uplink signal.

FIG. 10 is a diagram illustrating header compression of the uplink signal.

As shown in FIG. 10, the Source address of the IP header of the uplink signal is omitted. Since other fields are fields generally used, those fields will not be particularly described here.

Figure 11:
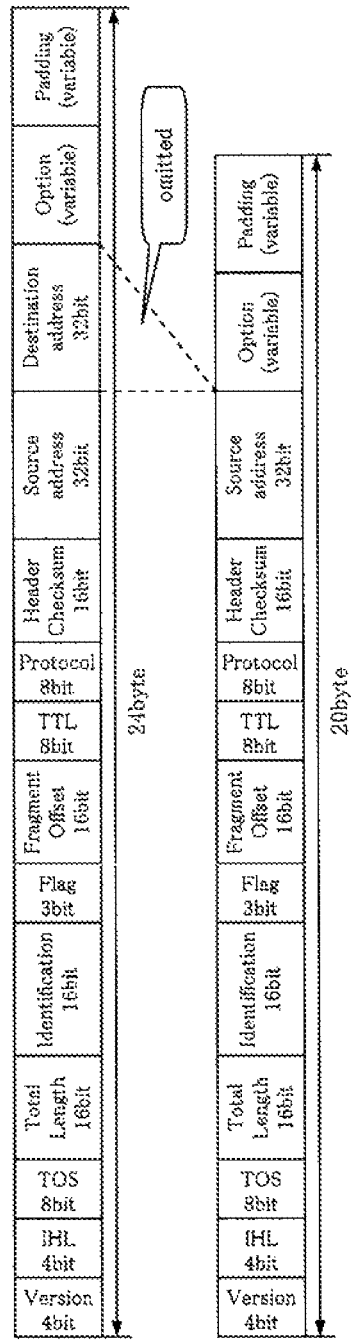
FIG. 11 is a diagram illustrating header compression of a downlink signal.

FIG. 11 is a diagram illustrating header compression of the downlink signal.

As shown in FIG. 11, the Destination address of the IP header of the downlink signal is omitted. Other fields are the same as those shown in FIG. 10.

A PHS rule showing that the aforementioned fields are omitted is generated. To be more specific, the PHS rule generated includes the following information.

(1) PHSF (PHS-Field)
(2) PHSM (PHS-MASK)
(3) PHSS (PHS-Size)

PHSF indicates information on a header to be compressed (omitted). That is, PHSF is information indicating data itself included in the part to be compressed (omitted). This information is used when the receiving side restores the compressed header to its original state.

PHSM is information indicating the position of a portion to be compressed (omitted) within the header. When, for example, the IP address or port number or the like, which is not changed during reporting, is compressed, this information indicates the position of the corresponding portion. Furthermore, when this PHSM indicates the position of an IP address, the IP address is shown in PHSF.

PHSS is information indicating the number of data items to be compressed according to the PHS rule and coincides with the length of PHSF.

The PHS nine made up of the information is output from service flow generation section 142 to BS interface section 141 and in step 11, transmitted from BS interface section 141 to BS 105.

After that, a DSA-REQ/RSP/ACK message for establishing a new service flow is transmitted/received between BS 105 and MS 106 in steps 12 to 14 one time for the uplink and the downlink. In this case, a DSA-REQ message which is a service flow establishment request signal transmitted from BS 105 to MS 106 includes the PHS rule transmitted from ASN-GW 104 in step 11.

Figure 12:
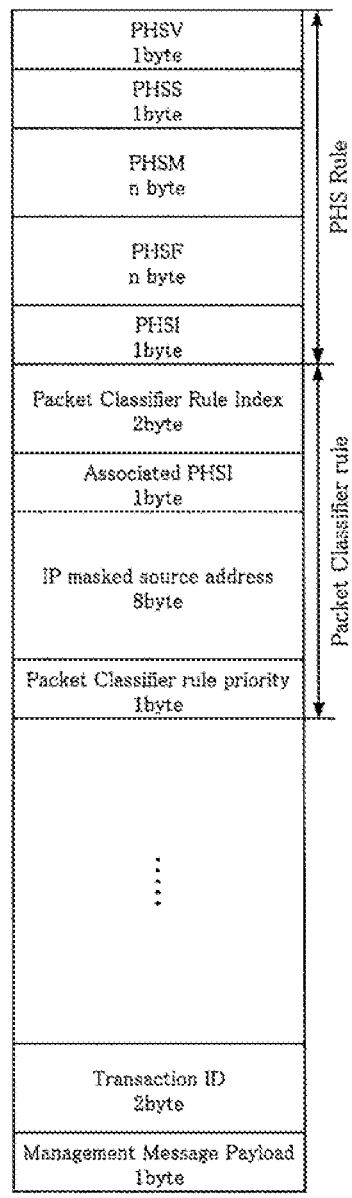
FIG. 12 is a diagram illustrating an example of a DSA-REQ message including the PHS rule.

FIG. 12 is a diagram illustrating an example of the DSA-REQ message including the PHS rule.

As shown in FIG. 12, the DSA-REQ message includes the PHS rule. Here, whether or not the PHS rule is included in the DSA-REQ message is judged depending on whether or not Associated PHSI (PHS-Index) shown in FIG. 12 is included in a Packet Classifier rule. For example, when Associated PHSI is included in the Packet Classifier rule, the PHS rule is judged to be included in the DSA-REQ message. Whether or not Associated PHSI is included in the Packet Classifier rule can be judged by TLV (Type, Length, Value). Furthermore, PHSI is a field made up of 1 byte and is an index indicating the number of the PHS rule that follows. The same number is shown in Associated PHSI and PHSI. Furthermore, PHSF, PHSM and PHSS are the aforementioned information. Furthermore, PHSV (PHS-Valid) is a Verify field to verify whether or not the value compressed during compression under this PHS rule is correct. For example, this may indicate the result of applying a predetermined calculation to a field of the PHS rule. The other fields of DSA-REQ are general fields and will not be described here.

After that, in steps 15 to 18, the IP address is requested from MS 106 to DHCP server 103 via BS 105 and ASN-GW 104, and the IP address is assigned from DHCP server 103 to MS 106. The method of assigning the IP address by DHCP server 103 is the same as a general method. The IP address assigned here is the same as the previous one, that is, the IP address stored in address correspondence table 144. Thus, communication is carried out between BS 105 and MS 106 in step 19 by applying the PHS rule hereafter.

Hereinafter, the method for MS 106 to subscribe to the communication system (Network Entry) shown in FIG. 6 when address correspondence table 144 shown in FIG. 7 does not store the correspondence between the MAC address given to MS 106 and the IP address will be described. A case where the MAC address of MS 106 is "05-0A-03-0B-01-0C" will be described as an example.

Figure 13:
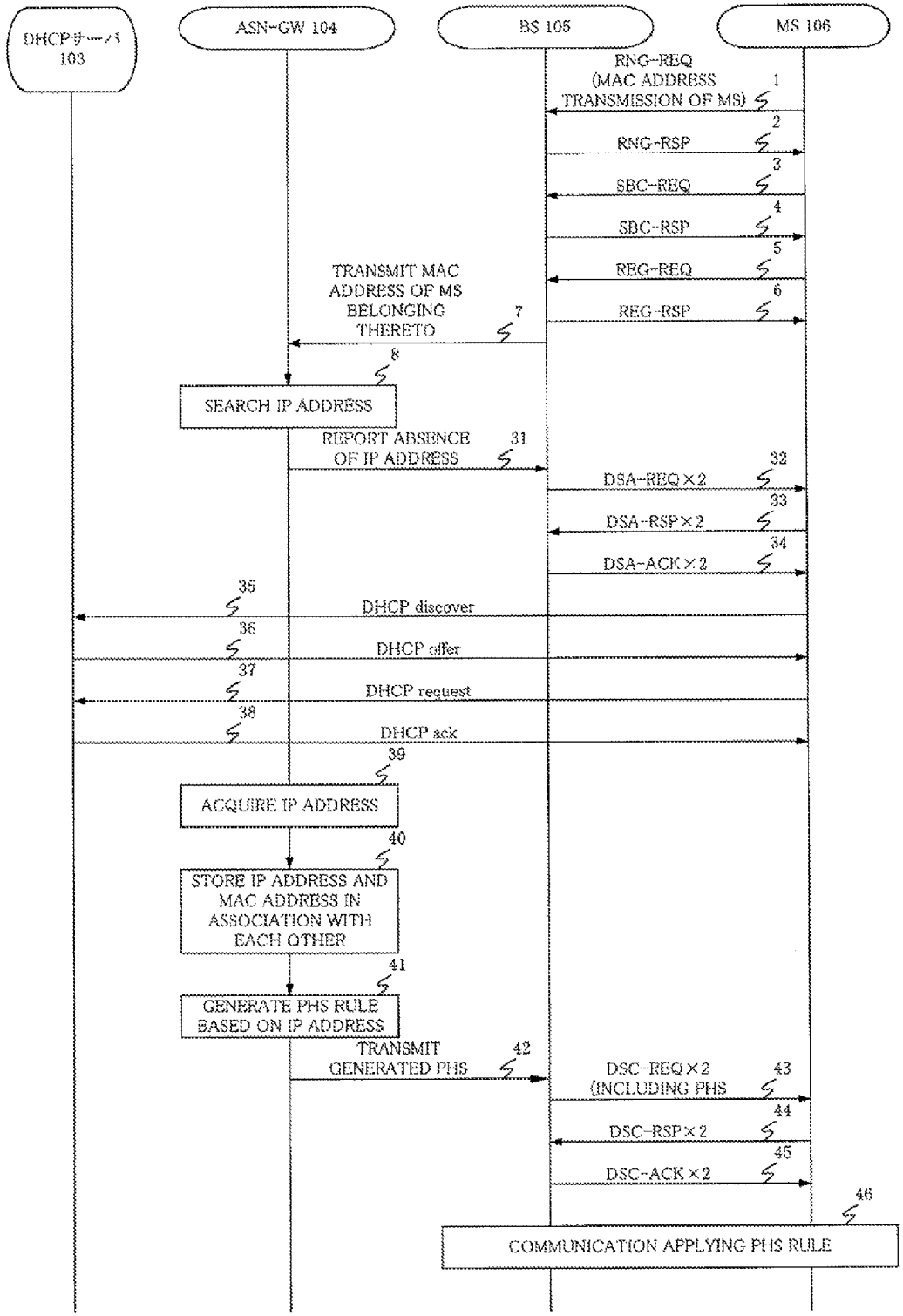
FIG. 13 is a sequence diagram illustrating a method for the MS to subscribe to the communication system shown in FIG. 6 when the address correspondence table shown in FIG. 7 does not store the correspondence between the MAC address given to the MS and the IP address.

FIG. 13 is a sequence diagram illustrating the method for MS 106 to subscribe to the communication system shown in FIG. 6 when address correspondence table 144 shown in FIG. 7 does not store the correspondence between the MAC address given to MS 106 and the IP address.

The processing in steps 1 to 8 is the same as the processing described using FIG. 9.

Here, since this is a case where the correspondence between MAC address given to MS 106 and the IP address is not stored in address correspondence table 144, the IP address corresponding to MAC address "05-0A-03-0B-01-0C" is not acquired. Therefore, in step 31, service flow generation section 142 generates a signal indicating the absence of the IP address, the signal is transmitted to BS 105 via BS interface section 141 and the fact that no IP address corresponding to MAC address "05-0A-03-0B-01-0C" exists in the address correspondence table is reported.

After that, a DSA-REQ/RSP/ACK message for establishing a new service flow is transmitted/received between BS 105 and MS 106 in steps 32 to 34 one time for the uplink and the downlink. Here, since there is no PHS rule, a normal DSA-REQ/RSP/ACK message is transmitted/received.

In steps 35 to 38, an IP address is requested from MS 106 to DHCP server 103 via BS 105 and ASN-GW 104 and an IP address is assigned from DHCP server 103 to MS 106.

In this case, the IP address is assigned from DHCP server 103 to MS 106, CSN data transfer section 143 detects the data transfer of DHCP, and the IP address is acquired in step 39. The acquired IP address is associated with the MAC address by CSN data transfer section 143 in step 40 and stored in address correspondence table 144.

At the same time, the fact that the correspondence between the MAC address and the IP address is stored in address correspondence table 144 is reported from CSN data transfer section 143 to service flow generation section 142. Taking this opportunity, service flow generation section 142 looks up address correspondence table 144 and a PHS rule is generated based on the IP address in step 41. The method of generating the PHS rule is the same as the method described using step 10 shown in FIG. 9.

The PHS rule generated is then output in step 42 from service flow generation section 142 to BS interface section 141 and transmitted from BS interface section 141 to BS 105.

After that, a DSC (Dynamic Service Change)-REQ/RSP/ACK message for changing the service flow is transmitted/received between BS 105 and MS 106 in steps 43 to 45 one time for the uplink and the downlink. In this case, a DSC-REQ message which is a service flow establishment request signal transmitted from BS 105 to MS 106 includes the PHS rule transmitted from ASN-GW 104 in step 42.

After that, in step 46, communication applying the PHS rule is carried out between BS 105 and MS 106.

Thus, since the IP address assigned by DHCP is associated with the MAC address of MS 106 and stored in ASN-GW 104, even when the IP address of MS 106 is not a fixed IP address, it is possible to generate a PHS rule for compressing the IP address portion. Furthermore, the PHS rule can be generated not manually, but automatically by ASN-GW 104. Furthermore, even if the DSA-REQ message is not used, a DSC-REQ message can be used as a substitute and initial Network Entry can also obtain effects comparative to those of second and subsequent Network Entries. Furthermore, when the IP address stored in ASN-GW 104 is different from the IP address assigned from DHCP server 103, the PHS rule can be applied again by performing the processing in steps 39 to 46.

DHCP server 103 may be identical to ASN-GW 104 and share address correspondence table 144. Alternatively, ASN-GW 104 may store IP address information assigned from an outside authentication server in address correspondence table 144 when subscribing MS 106 as a DHCP proxy server.

The aforementioned messages of RNG-REQ/RSP, SBC-REQ/RSP, REG-REQ/RSP, DSA-REQ/RSP/ACK and DSC-REQ/RSP/ACK are generally used, and therefore details of the respective messages will not be described here.

Furthermore, the aforementioned processing of ASN-GW 104 may be executed by a logical circuit tailored to the purpose. Furthermore, a program describing the processing contents as a procedure may be recorded in a recording medium readable to ASN-GW 104, the program recorded in the recording medium may be read and executed by ASN-GW 104. The recording medium readable to ASN-GW 104 refers to a portable recording medium such as floppy disk (registered trademark), magneto-optical disk, DVD, CD and memory such as ROM, RAM built in ASN-GW 104 and HDD or the like. The program recorded in the recording medium is read into a CPU (not shown) in ASN-GW 104 and the same processing as that described above is performed under the control of the CPU. Here, ASN-GW 104 operates as a computer that executes the program read from the recording medium in which the program is recorded.

As described so far, the present invention has the following effects.

A first effect is that since the correspondence between the IP address assigned by DHCP server 103 and the MAC address of MS 106 is stored in address correspondence table 144 of ASN-GW 104, it is possible to generate a PHS rule for compressing the IP address portion even when the IP address of MS 106 is not a fixed IP address.

A second effect is that since ASN-GW 104 acquires and reflects the IP address assigned by DHCP server 103, ASN-GW 104 can generate a PHS rule not manually but automatically.

A third effect is that taking advantage of the fact that DHCP server 103 assigns the same IP address to the same MAC address, it is possible to generate a PHS rule before DHCP server 103 assigns the IP address when subscribing MS 106 (Network Entry) from the second time onward. That is, it is possible to carry out communication applying the PHS rule immediately after DHCP server 103 assigns the IP address.

The present invention has been described so far with reference to the exemplary embodiments, but the present invention is not limited to the above described exemplary embodiments. Various modifications understandable to those skilled in the art can be made to the configuration and details of the present invention without departing from the scope of the present invention.

The present application is the National Phase of PCT/JP2009/060311, filed Jun. 5, 2009, which claims priority based on JP2008-170416A, filed on Jun. 30, 2008, the disclosure of which is incorporated herein by reference in its entirety.

The invention claimed is:

1. A communication system comprising:
a mobile station;
a base station that communicates with the mobile station by applying a header compression rule for compressing a packet header; and
a connection device that connects the base station to a predetermined network,
wherein the mobile station transmits a physical address given to the mobile station to the connection device via the base station when subscribing to the communication system, and
the connection device comprises an address storage section that previously stores the physical address given to the mobile station and an IP address in association with each other, searches the address storage section for the IP address corresponding to the physical address transmitted from the mobile station, generates the header compression rule in accordance with the IP address searched for, and transmits the generated header compression rule to the mobile station via the base station.

2. The communication system according to claim 1, wherein the connection device generates a header compression rule for compressing the IP address searched for.

3. The communication system according to claim 1, wherein when an IP address corresponding to the physical address transmitted from the mobile station does not exist in the address storage section, the connection device then stores the IP address acquired by the mobile station from a server that assigns IP addresses and the physical address in the address storage section in association with each other.

4. The communication system according to claim 1, wherein the base station includes the header compression rule transmitted from the connection device in a service flow establishment request signal for establishing a service flow to/from the mobile station and transmits the header compression rule to the mobile station.

5. The communication system according to claim 1, wherein the communication system is a WiMAX system.

6. A connection device connected to a base station that communicates with a mobile station by applying a header compression rule for compressing a packet header, comprising:
an address storage section that previously stores a physical address given to the mobile station and an IP address in association with each other;
a service flow generation section that searches the address storage section for the IP address corresponding to the physical address transmitted from the mobile station and generates a header compression rule in accordance with the IP address searched for; and
a base station interface section that transmits the generated header compression rule to the mobile station via the base station.

7. The connection device according to claim 6, wherein the service flow generation section generates a header compression rule for compressing the IP address searched for.

8. The connection device according to claim 6, further comprising a CSN data transfer section that stores, when the IP address corresponding to the physical address transmitted from the mobile station does not exist in the address storage section, the IP address acquired thereafter by the mobile station from a server that assigns IP addresses and the physical address in the address storage section in association with each other.

9. A connection method for a communication system comprising a mobile station, a base station that communicates with the mobile station by applying a header compression rule for compressing a packet header and a connection device that connects the base station to a predetermined network, comprising:
- a step of the mobile station transmitting a physical address given to the mobile station to the connection device via the base station when subscribing to the communication system;
- a step of the connection device previously storing the physical address given to the mobile station and an IP address in a table of the connection device in association with each other;
- a step of the connection device searching the table for the IP address corresponding to the physical address transmitted from the mobile station;
- a step of the connection device generating a header compression rule in accordance with the IP address searched for; and
- a step of the connection device transmitting the generated header compression rule to the mobile station via the base station.

10. The connection method according to claim 9, wherein the connection device comprises a step of generating a header compression rule for compressing the IP address searched for.

11. The connection method according to claim 9, further comprising a step of the connection device storing, when the IP address corresponding to the physical address transmitted from the mobile station does not exist in the table, the IP address acquired thereafter by the mobile station from a server that assigns IP addresses and the physical address in the table in association with each other.

12. The connection method according to claim 9, further comprising a step of the base station including the header compression rule transmitted from the connection device in a service flow establishment request signal for establishing a service flow to/from the mobile station and transmitting the header compression rule to the mobile station.

13. A connection method of connecting a mobile station to a network via a base station, comprising:
- a step of previously storing a physical address given to the mobile station and an IP address in association with each other;
- a step of searching the stored correspondence for the IP address corresponding to the physical address transmitted from the mobile station;
- a step of generating a header compression rule for compressing a packet header in accordance with the IP address searched for; and
- a step of transmitting the generated header compression rule to the mobile station via the base station.

* * * * *